(12) United States Patent
Yamada et al.

(10) Patent No.: US 7,823,676 B2
(45) Date of Patent: Nov. 2, 2010

(54) COAXIAL TWO-WHEELED INVERTED PENDULUM TYPE MOVING VEHICLE

(75) Inventors: Koji Yamada, Toyota (JP); Masaaki Yamaoka, Toyota (JP); Toshio Fuwa, Nisshin (JP); Mitsuo Koide, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/278,002

(22) PCT Filed: Feb. 1, 2007

(86) PCT No.: PCT/JP2007/051729
§ 371 (c)(1),
(2), (4) Date: Aug. 1, 2008

(87) PCT Pub. No.: WO2007/088944
PCT Pub. Date: Aug. 9, 2007

(65) Prior Publication Data
US 2009/0051136 A1 Feb. 26, 2009

(30) Foreign Application Priority Data
Feb. 3, 2006 (JP) .............................. 2006-027481

(51) Int. Cl.
*B62K 17/00* (2006.01)
(52) U.S. Cl. .................. 180/218; 180/7.1; 180/6.5; 180/282
(58) Field of Classification Search ............ 180/218, 180/7.1, 6.5, 282
See application file for complete search history.

(56) References Cited

U.S. PATENT DOCUMENTS 5,161,634 A * 11/1992 Ichihara et al. ............. 180/179

FOREIGN PATENT DOCUMENTS

JP 63-305082 12/1988

OTHER PUBLICATIONS

First Office Action for Chinese Application No. 200780004239.4 dated Jun. 9, 2010.

* cited by examiner

*Primary Examiner*—Tony H. Winner
*Assistant Examiner*—Jacob Knutson
(74) *Attorney, Agent, or Firm*—Finnegan, Henderson, Farabow, Garrett & Dunner, LLP

(57) ABSTRACT

The present invention provides, in connection with a coaxial two-wheeled inverted pendulum type moving vehicle, a technique which allows sudden braking without making a vehicle body to tilt significantly backward. The coaxial two-wheeled inverted pendulum type moving vehicle of the present invention comprises a pair of wheels, a chassis for supporting the pair of wheels coaxially and rotatably, wheel actuators for rotating the wheels with respect to the chassis, a vehicle body supported by the chassis, and an inverted pendulum control unit for controlling the wheel actuators so as to maintain the balanced state of the chassis. In this moving vehicle, the vehicle body is shiftable supported by the chassis in a manner that the vehicle body may shift in a direction parallel to the moving direction of the moving vehicle with respect to the chassis. The traveling body further comprises an attitude actuator for shifting the vehicle body along the moving direction of the moving vehicle with respect to the chassis, and a braking attitude control unit for controlling the attitude actuator so as to shift the vehicle body to a direction opposite to the moving direction of the moving vehicle with respect to the chassis when braking is commenced while the moving vehicle is in motion.

10 Claims, 9 Drawing Sheets

U.S. PATENT DOCUMENTS

| | | |
|---|---|---|
| 5,701,965 A | 12/1997 | Kamen et al. |
| 5,791,425 A | 8/1998 | Kamen et al. |
| 6,062,600 A | 5/2000 | Kamen et al. |
| 6,223,104 B1 | 4/2001 | Kamen et al. |
| 6,302,230 B1 | 10/2001 | Kamen et al. |
| 6,311,794 B1 | 11/2001 | Morrell et al. |
| 6,367,817 B1 | 4/2002 | Kamen et al. |
| 6,386,576 B1 | 5/2002 | Kamen et al. |
| 6,543,564 B1 * | 4/2003 | Kamen et al. ............ 180/89.13 |
| 6,571,892 B2 * | 6/2003 | Kamen et al. ................ 180/8.2 |
| 6,789,640 B1 | 9/2004 | Arling et al. |
| 6,837,327 B2 | 1/2005 | Heinzmann |
| 7,363,993 B2 * | 4/2008 | Ishii ........................... 180/7.1 |

FOREIGN PATENT DOCUMENTS

| | | |
|---|---|---|
| JP | 4-15713 | 1/1992 |
| JP | 2003-528756 | 9/2003 |
| JP | 2004-276727 | 10/2004 |
| JP | 2005-39962 | 2/2005 |
| JP | 2005-145296 | 6/2005 |
| JP | 2007-176398 | 7/2007 |
| JP | 2007-176399 | 7/2007 |

COAXIAL TWO-WHEELED INVERTED PENDULUM TYPE MOVING VEHICLE

CROSS-REFERENCE TO RELATED APPLICATION

This present application is a national phase application of International Application No. PCT/JP2007/051729, filed Feb. 1, 2007, and claims priority to Japanese Patent Application No. 2006-027481, filed on Feb. 3, 2006, the contents of both of which are hereby incorporated by reference into the present application.

TECHNICAL FIELD

The present invention relates to a coaxial two-wheeled inverted pendulum type moving vehicle comprising a pair of wheels, a chassis for coaxially supporting the pair of wheels in rotatable manner, wheel actuators for rotating the wheels with respect to the chassis, a vehicle body supported by the chassis, and an inverted pendulum control unit for controlling the wheel actuators so as to dynamically balance the chassis.

BACKGROUND ART

A coaxial two-wheeled inverted pendulum type moving vehicle is provided with a pair of wheels, a chassis for coaxially supporting the pair of wheels in a rotatable manner, wheel actuators for rotating the wheels with respect to the chassis, and a vehicle body supported by the chassis. An example thereof is disclosed in Japanese Patent Application Publication No. S63-305082. In this type of coaxial two-wheeled inverted pendulum type moving vehicle, the wheel actuators are controlled by an inverted pendulum control unit, and the moving vehicle moves while maintaining the chassis in an dynamically balanced state. Usually, rotational angle of each of the wheels, rotational angular velocity of each of the wheels, inclinational angle of the chassis and inclinational angular velocity of the chassis are detected, and the torque of each wheel actuator is controlled based on the obtained detection results. The balanced attitude of the chassis is thereby maintained dynamically while the vehicle body does not make contact with the ground. The coaxial two-wheeled inverted pendulum type moving vehicle can move, stop and turn while dynamically balancing itself with the inverted pendulum state of the chassis.

In this specification, rotational angle and inclinational angle are determined with respect to the vertical direction. For example, a rotational angle of a wheel means an angle between a reference line extending in the wheel's radial direction from the center of the wheel and the vertical line, and an inclinational angle of the chassis means an angle between a reference line fixed to the chassis and the vertical line.

In the coaxial two-wheeled inverted pendulum type moving vehicle, torque is generated between the chassis and each of the wheels to rotate the wheels. The rotation of the wheels allows the moving vehicle to move, turn and stop. When the wheels are rotated, torque is exerted from the wheels to the chassis due to the reaction of the rotation, which causes the chassis to tilt. Thus, the coaxial two-wheeled inverted pendulum type moving vehicle dynamically maintains the balance of the chassis while controlling the counterbalance of a gravitational moment which acts on the chassis that has been tilted due to the torque exerted on the chassis from the wheels, an inertial moment which acts on the chassis and the torque which acts on the chassis from the wheels.

In a case of starting to move from a standstill state, the wheel actuators are controlled such that a torque is applied to the wheels, of which in consequence would cause the chassis to incline forward in the moving direction. The moving vehicle starts to move while the chassis maintains balanced attitude, with the counterbalance of the gravitational moment which acts on the forwardly inclined chassis, the inertial moment which acts on the chassis and the torque which acts on the chassis from the wheels in equilibrium.

In a case of stopping while moving, the wheel actuators are controlled such that a torque is applied to the wheels, of which in consequence would cause the chassis to incline backward in the moving direction. The moving vehicle stops moving while the chassis maintains balanced attitude, with the counterbalance of the gravitational moment which acts on the backwardly inclined chassis, the inertial moment which acts on the chassis and the torque which acts on the chassis from the wheels in equilibrium.

DISCLOSURE OF INVENTION

The coaxial two-wheeled inverted pendulum type moving vehicle generally connotes the difficulty in sudden braking during traveling, which often results in long braking distance. At the time of sudden braking, a significant inertia force acts on the chassis, and therefore the chassis is forced to incline backward to a great degree. As for the conventional coaxial two-wheeled inverted pendulum type moving vehicle that has a vehicle body (having a man on-board seat or a platform for loading goods thereon) fixed to the chassis, the vehicle body is greatly tilted backward when the chassis is significantly tilted backward due to a sudden braking. Under such circumstance, the rider may experience postural instability. Similarly, even in the case where the moving vehicle carries goods instead of a human, the attitude of loaded goods may become instable under such condition. Accordingly, the conventional coaxial two-wheeled inverted pendulum type moving vehicle involved difficulty in sudden braking and undesirably long braking distance. For a safer coexistence of a human and the coaxial two-wheeled inverted pendulum type moving vehicle, it is required for the moving vehicle to be capable of sudden braking in order to ensure the safety of its surrounding environment. For ensuring safety both for the rider and the surrounding environment, a technique that allows sudden braking without significant tilt of the vehicle body is needed.

The present invention solves the above problem. In connection with a coaxial two-wheeled inverted pendulum type moving vehicle, the present invention provides a technique capable of applying sudden braking without significant tilt of the vehicle body in the backward direction.

A coaxial two-wheeled inverted pendulum type moving vehicle created by the present invention comprises a pair of wheels, a chassis that supports the pair of wheels coaxially and rotatably, wheel actuators that rotate the pair of wheels with respect to the chassis, a vehicle body supported by the chassis, and an inverted pendulum control unit that controls the wheel actuators to maintain the vehicle body in a balanced state. In this moving vehicle, the vehicle body is shiftably supported by the chassis; the vehicle body may shift with respect to the chassis in a direction that is parallel to or along a moving direction, whether it be a direction of forward-moving or backward-moving, of the moving vehicle. The moving vehicle further comprises an attitude actuator that is configured to shift the vehicle body with respect to the chassis in the direction parallel to or along the moving direction of the moving vehicle, and a braking attitude control unit that controls the attitude actuator to shift the vehicle body with respect to the chassis to an opposite direction of the moving direction of the moving vehicle when a braking is commenced while the moving vehicle in motion.

As for the conventional coaxial two-wheeled inverted pendulum type moving vehicle, a portion which supports the pair of wheels and the portion to which the vehicle body is fixed are rigidly integral with each other, and the whole serves as a chassis. Such a chassis in which its attitude is rigid and unchangeable inevitably involves, at the time of sudden braking, significant tilt in the backward direction, and also the vehicle body inevitably involves significant tilt in backward direction.

As for the coaxial two-wheeled inverted pendulum type moving vehicle according to the present invention, the chassis which supports the pair of wheels and the vehicle body, on which a rider may ride or goods may be loaded, are configured to be separate from each other, and a relative positional relationship of the chassis and the vehicle body can be changed by the operation of the attitude actuator. That is, by shifting the vehicle body with respect to the chassis that supports the pair of wheels toward the direction opposite of the moving direction in which the moving vehicle advances, the center of gravity with respect to the wheels can be shifted to the opposite side of the advancing direction. This configuration liberates the vehicle body from the necessity of tilting the vehicle body significantly backward at the time of sudden braking. This is feasible due to the fact that the same advantage as that of the conventional chassis being tilted backward under such condition can be brought about, by shifting the vehicle body in the opposite direction of the moving direction, and the center of gravity with respect to the wheels can be shifted to the opposite side of the moving direction of the moving vehicle.

Since the coaxial two-wheeled inverted pendulum type moving vehicle of the present invention is provided with a braking attitude control unit that operates the attitude actuator at the time when the braking has started, so as to cause the vehicle body to shift with respect to the chassis in the opposite direction of the moving direction of the moving vehicle, sudden braking can be effectively applied without causing a significant tilt in the direction backward to the moving direction in the vehicle body. Sudden braking may thus be applied to the moving vehicle without causing the rider or goods on board to be in an instable attitude.

According to the coaxial two-wheeled inverted pendulum type moving vehicle of the present invention, even in a case where the braking had not been performed in time, and collision of the moving vehicle against an obstacle happens as its result, the rider or goods can be kept impervious to the effect of the hazard because the vehicle body is retracted backward at the time of commencing the braking motion.

In the present invention, since the braking is applied in the state where the vehicle body is shifted with respect to the chassis to the opposite direction of the moving direction of the moving vehicle, the inclinational angle of the chassis in the backward direction can be reduced. Thus, the configuration of the present technique requires simply one degree of freedom which allows the vehicle body to move in the moving direction with respect to the chassis.

According to a further improved technique, it is preferable that the inclinational angle (i.e., an angle with respect to a vertical line) of the vehicle body is invariable even during braking. That is, it is preferable that the vehicle body to be configured shiftable in the moving direction and swingable with respect to the chassis within a vertical plane including the traveling direction. In this case, a member may be interposed between the chassis and the vehicle body so as to ensure two degrees of freedom.

As for an improved moving vehicle according to the present invention, the vehicle body may be supported by the chassis with an intervenient member. The intervenient member may be swingably connected to the chassis such that the intervenient member may swing within a vertical plane including the moving direction. Furthermore, the intervenient member may slidably support the vehicle body such that the vehicle body may slide parallel to the moving direction. In this moving vehicle, the attitude actuator may comprise a first actuator that swings the intervenient member with respect to the chassis and a second actuator that slides the vehicle body with respect to the intervenient member.

According to the above improved moving vehicle, the vehicle body may be shifted with respect to the chassis to the opposite direction of the moving direction of the moving vehicle without changing the inclinational angle (i.e., an angle with respect to a vertical line) of the intervenient member. As long as the inclinational angle of the intervenient member is constant, the inclinational angle (i.e., an angle with respect to a vertical line) of the vehicle body, which merely slides back and forth with respect to the intervenient member, also does not change. The rider or goods on the vehicle body thereby does not experience significant tilt during braking. According to this improved moving vehicle, sudden braking may be efficiently applied while maintaining the inclinational angle of the vehicle body to be small within a predetermined range.

In another alternative configuration, two degrees of freedom between the chassis and the vehicle body may be ensured. In another improved moving vehicle according to the present invention, the vehicle body may be supported by the chassis with an intervenient member. The intervenient member may be connected to the chassis such that the intervenient member is configured to swing within a vertical plane including the moving direction, and may support the vehicle body to be swingable within such a vertical plane. In this moving vehicle the attitude actuator may comprise a first actuator that swings the intervenient member with respect to the chassis and a second actuator that swings the vehicle body with respect to the intervenient member.

In this moving vehicle, the inclinational angle (i.e., an angle with respect to a vertical line) of the vehicle body may be determined by the inclinational angle (i.e., an angle with respect to a vertical line) of the chassis, a relative angle of the intervenient member to the chassis and a relative angle of the vehicle body to the intervenient member. By balancing the relative angle of the intervenient member to the chassis and the relative angle of the vehicle body to the intervenient member, the vehicle body may be adjusted so as to be shifted with respect to the chassis to the opposite direction of the moving direction of the moving vehicle, and may maintain the inclinational angle of the vehicle body within a predetermined certain range. According to this improved moving vehicle, sudden braking may be efficiently applied while maintaining the inclinational angle of the vehicle body within a predetermined certain range.

Furthermore, according to this configuration, the height of the vehicle body can be changed while maintaining the inclinational angle of the vehicle body within the predetermined certain range. It may facilitate easier and smoother platform for the getting on and off of a rider, and loading and unloading of goods.

In a case where the chassis is configured to be rigid, if mechanical brakes are adopted and rotation of the wheels with respect to the chassis is restrained, it is difficult to dominate control to maintain the inverted pendulum condition of the chassis to be in a balanced state with the mere employment of the inverted pendulum control unit. For example, if sudden braking is applied by means of mechanical brakes while in motion, the chassis may tilt in the advancing direction of the moving vehicle due to inertia force. In the attempt to cope with such circumstance, the inverted pendulum control unit accelerates the wheels to preventing overturning. However, the control for accelerating the wheels that are restrained by the mechanical brakes may be beyond the control ability of a solely adopted inverted pendulum control unit.

The present invention adopts a configuration in which the chassis, which is conventionally rigid, and the vehicle body are separated from each other such that control of a relative position of the chassis and the vehicle body by an actuator. The mechanical brakes thus can be installed between the wheels and the chassis, and undesirable condition in which the inverted pendulum control unit being unable to govern control can be prevented. The inverted pendulum control unit can continue its function of controlling by taking advantage of the at least one degree of freedom between the chassis and the vehicle body.

As for a further improved moving vehicle according to the present invention, mechanical brakes that applies brake to the wheels with respect to the chassis may be installed.

According to this moving vehicle, sudden braking can be applied while maintaining the inclinational angle of the vehicle body small within a predetermined range while utilizing the strong braking force of the mechanical brakes.

The following effects may be obtained by the coaxial two-wheeled inverted pendulum type moving vehicle according to the present invention:

Sudden braking can be applied without tilting the vehicle body significantly. This enables a safe coexistence of human and the moving vehicle;

In a case where two degrees of freedom are ensured between the chassis and the vehicle body, the inclinational angle of the vehicle body can be positively controlled so as to stabilize the attitude of a rider or goods during braking; and The present invention enables employment of mechanical brakes, and sudden braking which utilizes the strong braking force of the mechanical brakes can be realized.

BRIEF DESCRIPTION OF THE DRAWINGS

FIG. 6A illustrates the moving vehicle 10 during travel, and FIG. 6B illustrates the moving vehicle 10 during braking.

FIG. 8A illustrates the moving vehicle 110 during travel, and FIG. 8B illustrates the moving vehicle 110 during braking.

BEST MODE FOR CARRYING OUT THE INVENTION

Some of the preferred features of embodiments in which the present invention may be carried out will be listed below.

(Mode 1) A moving vehicle may be provided with an onboard seat on a vehicle body for transporting a rider. Braking processing may be commenced by the operation performed by the rider. An attitude actuator may be operated by a braking attitude control unit so as to cause the vehicle body to shift to the opposite side of an advancing direction of the moving vehicle with respect to a chassis.

(Mode 2) A moving vehicle may be provided with an obstacle sensor. Upon detection of an obstacle, a braking processing may be commenced and an attitude actuator may be operated by a braking attitude control unit so as to cause the vehicle body to shift to the opposite side of an advancing direction of the moving vehicle with respect to a chassis.

(Mode 3) A moving vehicle may apply brake by means of mechanical brakes upon commencement of a braking processing.

Embodiments of the Invention

First Embodiment

Figure 1:
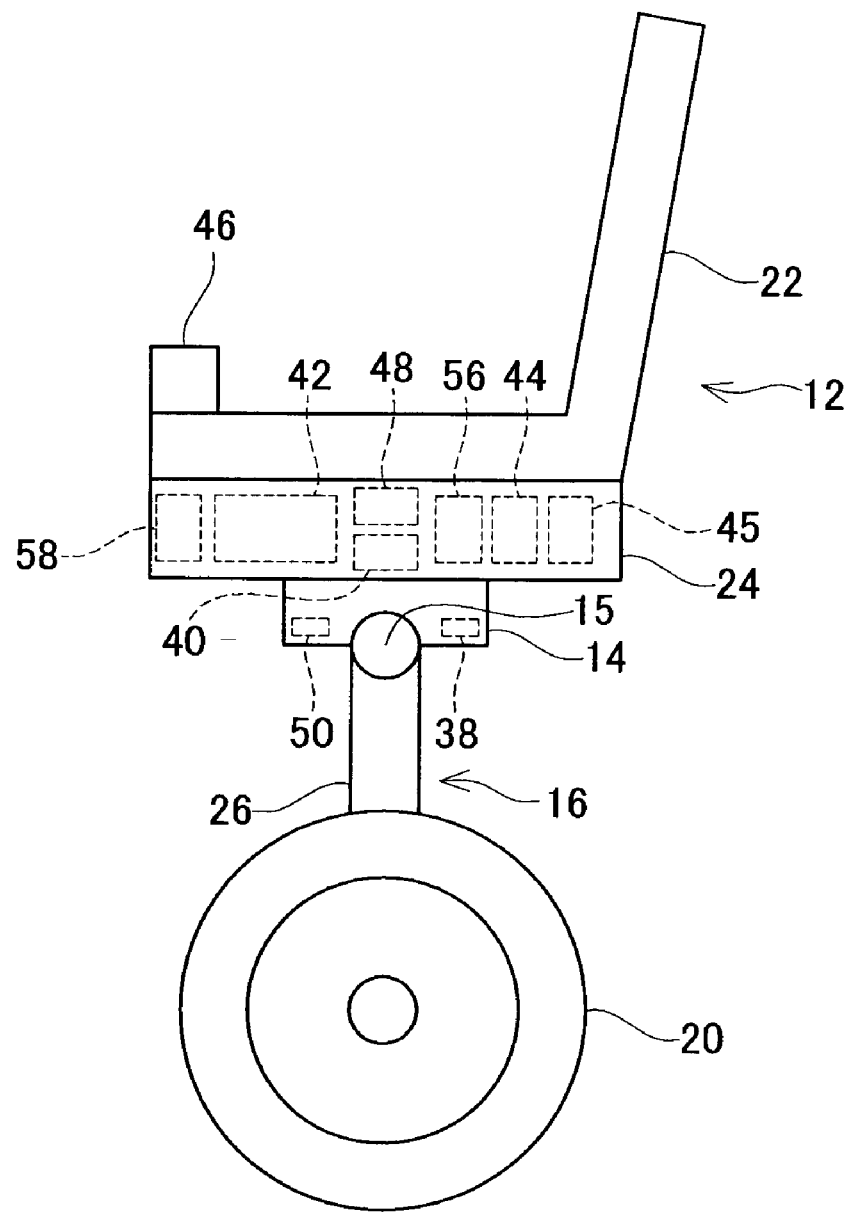
FIG. 1 is a side view of a moving vehicle 10 of the first embodiment.
Figure 2:
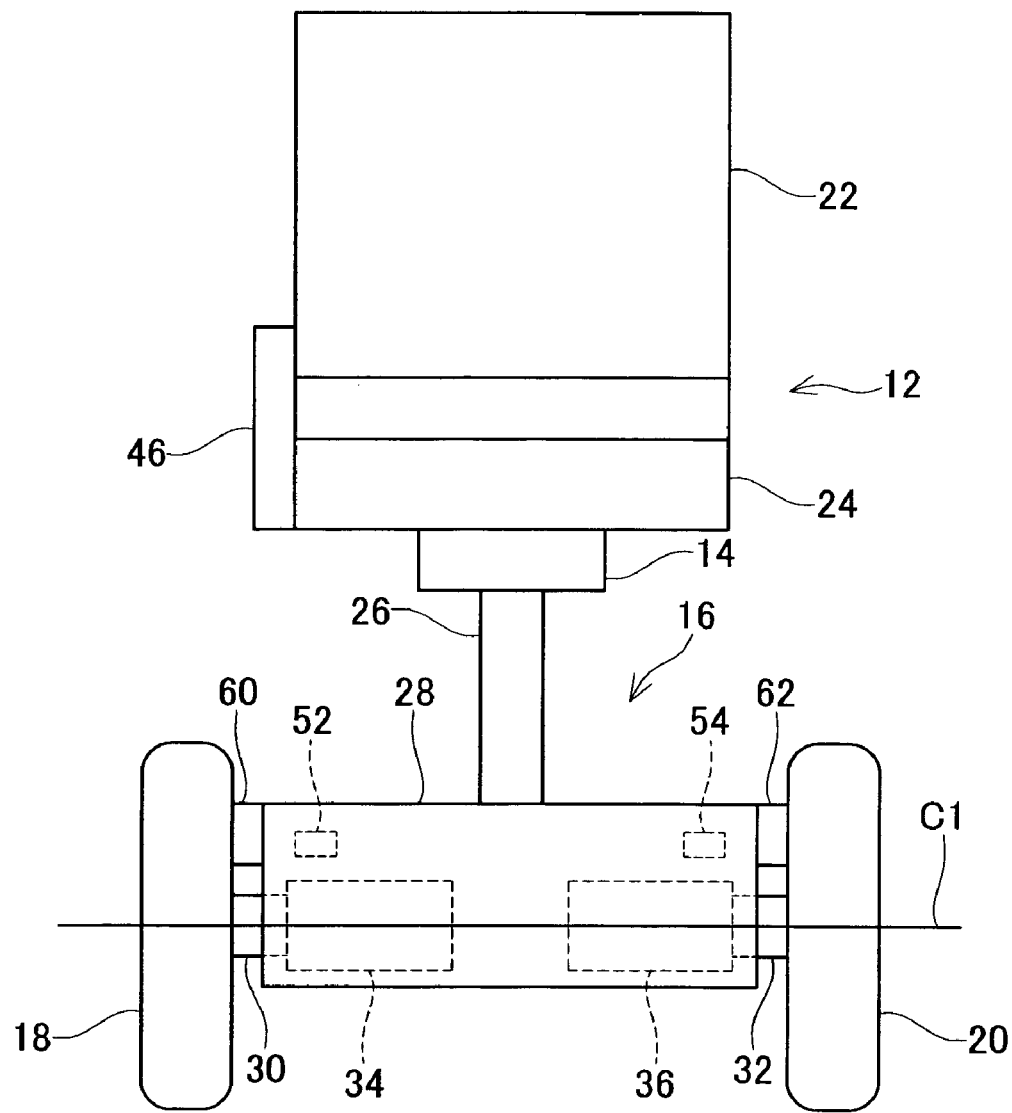
FIG. 2 is a front view of the moving vehicle 10 of the first embodiment.

A first embodiment of the present invention will be described below with reference to the drawings. FIG. 1 is a side view of a moving vehicle 10 of this embodiment. FIG. 2 is a front view thereof.

The moving vehicle 10 includes a right driving wheel 18, a left driving wheel 20, a chassis 16, an intervenient link 14 and a vehicle body 12.

The right driving wheel 18 and the left driving wheel 20 correspond to a pair of wheels. The chassis 16 includes a mount 28 and a rod 26. The mount 28 and the rod 26 are integrally formed. The mount 28 rotatably supports the right driving wheel 18 with an axle 30 and rotatably supports the left driving wheel 20 with an axle 32. The axles 30 and 32 are aligned on the same rotational axis C1. The chassis 16 maintains the right and left driving wheels 18 and 20 in a coaxially aligned state and supports both wheels in a manner that each of the wheels may rotate independently. The intervenient link 14 is connected to an upper end of the rod 26 so as to be able to swing around a rotary shaft 15. The intervenient link 14 is swingable within a vertical plane including the traveling direction of the moving vehicle 10 (which corresponds to a plane parallel to the paper surface of FIG. 1). The intervenient link 14 slidably supports the vehicle body 12 in the traveling direction of the moving vehicle 10 (which corresponds to the right-and-left direction in FIG. 1). The vehicle body 12 includes an onboard seat 22 and a housing 24 which are integrally formed. The intervenient link 14 corresponds to an intervenient member. The vehicle body 12 is supported by the chassis 16 with the intervenient link 14 in-between.

The mount 28 includes a right wheel driving motor 34 for rotating the right driving wheel 18 through the axle 30 with respect to the mount 28, and a left wheel driving motor 36 for rotating the left driving wheel 20 through the axle 32 with respect to the mount 28. The right wheel driving motor 34 and the left wheel driving motor 36 may each be controlled independently. The motors 34 and 36 correspond to wheel actuators.

The moving vehicle 10 includes a joint drive motor 38 which swings the intervenient link 14 around the rotary shaft 15 with respect to the chassis 16. The joint drive motor 38 is installed in the intervenient link 14. The joint drive motor 38 corresponds to a first actuator.

The moving vehicle 10 includes a linear motor 40 which slides the vehicle body 12 both forward and backward in the traveling direction of the moving vehicle 10 with respect to the intervenient link 14. The linear motor 40 is mounted on the housing 24. The linear motor 40 corresponds to a second actuator.

The moving vehicle 10 includes a battery module 42 for supplying electric power to the right wheel driving motor 34, the left wheel driving motor 36, the joint drive motor 38 and the linear motor 40; a travel control module 44 for controlling the right and left wheel driving motors 34, 36, an attitude control module 45 for controlling the operation of the joint drive motor 38 and the operation of the linear motor 40; and an maneuver module 46 which is maneuvered by a rider on the moving vehicle 10. The travel control module 44 controls the right wheel driving motor 34 and the left wheel driving motor 36 so as to control the movement of the moving vehicle 10, in accordance with the control performed on the maneuver module 46 by the rider of the moving vehicle 10. The attitude control module 45 controls the joint drive motor 38 and the linear motor 40 to control the relative positional relationship of the vehicle body 12 with respect to the chassis 16. The travel control module 44 corresponds to an inverted pendulum control unit. The attitude control module 45 corresponds to a braking attitude control unit.

The moving vehicle 10 includes a joint encoder 50 for detecting a swing angle of the intervenient link 14 with respect to the chassis 16, a displacement gauge 56 for detecting the amount of sliding of the vehicle body 12 with respect to the intervenient link 14, and a gyro sensor 48 for detecting the inclinational angular velocity of the vehicle body 12. As to the inclinational angle of the vehicle body 12, it is assumed hereafter that the inclinational angle in which the vehicle body 12 is tilted forward in the traveling direction of the moving vehicle 10 is positive, and the inclinational angle in which the vehicle body 12 is tilted backward in the traveling direction of the moving vehicle 10 is negative. Furthermore, the moving vehicle 10 includes a right wheel encoder 52 for detecting the rotational angle of the right driving wheel 18 with respect to the chassis 16 and a left wheel encoder 54 for detecting the rotational angle of the left driving wheel 20 with respect to the chassis 16.

As shown in FIG. 1, the moving vehicle 10 includes an optical obstacle sensor 58 mounted on the housing 24. Upon detecting an obstacle in front of the moving vehicle 10, the obstacle sensor 58 outputs a detection signal.

As shown in FIG. 2, the moving vehicle 10 includes mechanical brakes 60 and 62 arranged on the mount 28. The mechanical brake 60 is normally not in contact with the right driving wheel 18, but comes into physical contact with the right driving wheel 18 upon braking operation and restrains the rotation of the wheel 18 which rotates with respect to the chassis 16 with the frictional force. The mechanical brake 62 is normally not in contact with the left driving wheel 20, but comes into physical contact with the left driving wheel 20 upon braking operation and restrains the rotation of the wheel 20 which rotates with respect to the chassis 16 with the frictional force.

The maneuver module 46 includes an maneuvering lever (not shown) and a brake lever (not shown). The maneuvering lever is an operating member for the rider to control the traveling velocity and direction of the moving vehicle 10. The rider can adjust the traveling velocity of the moving vehicle 10 by adjusting the maneuvering amount of the maneuvering lever. Likewise, the rider can control the traveling direction of the moving vehicle 10 by adjusting the maneuvering direction of the maneuvering lever. The moving vehicle 10 can advance, stop, back up, turn left and right, circle clockwise and counter-clockwise in accordance with operations through the maneuvering lever. Further, the rider can brake the moving vehicle 10 by bringing down the brake lever.

Figure 3:
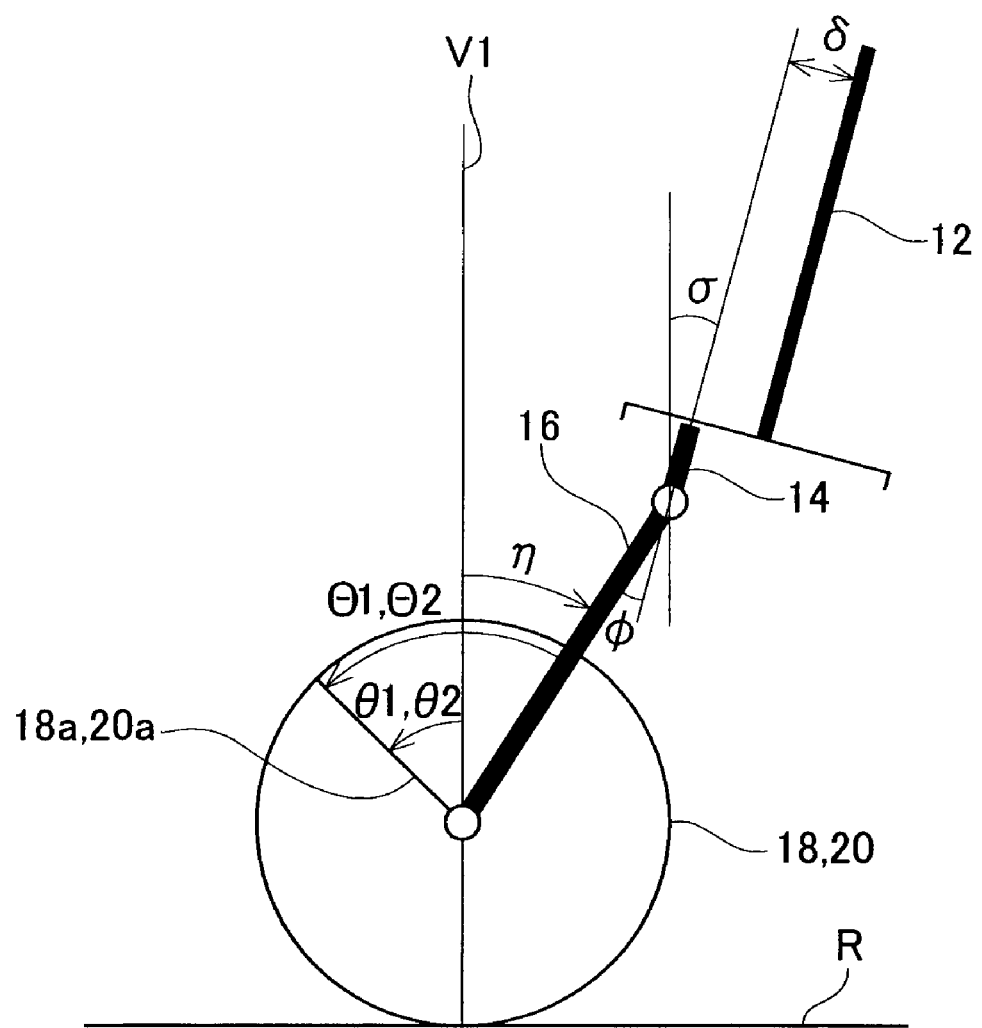
FIG. 3 is a schematic diagram of the mechanisms of the moving vehicle 10 of the first embodiment.

FIG. 3 schematically illustrates the mechanism of the moving vehicle 10. The right and left driving wheels 18, 20 are connected rotatably to a lower portion of the chassis 16, and are each in contact with the road surface R. The intervenient link 14 is connected to an upper portion of the chassis 16 such that the intervenient link 14 may swing within the vertical plane. The vehicle body 12 is connected to the intervenient link 14 slidable in the forward and backward directions.

In the following description, as shown in FIG. 3, it is assumed hereinafter that a rotational angle of a reference line 18$a$ of the right driving wheel 18 with respect to a vertical line V1 is $\theta 1$; a rotational angle of a reference line 20$a$ of the left driving wheel 20 with respect to the vertical line V1 is $\theta 2$; an inclinational angle of the chassis 16 with respect to the vertical line V1 is $\eta$; and an inclinational angle of the intervenient link 14 with respect to the vertical line V1 (which equals to the inclinational angle of the vehicle body 12 with respect to the vertical line V1) is $\sigma$. Moreover, it is further assumed that a relative rotational angle of the right driving wheel 18 with respect to the chassis 16 is $\Theta 1$; a relative rotational angle of the left driving wheel 20 with respect to the chassis 16 is $\Theta 2$; a relative rotational angle of the intervenient link 14 with respect to the chassis 16 is $\phi$; and a relative displacement quantity of the chassis 12 with respect to the intervenient link 14 is $\delta$. Kinematically, there exist the following relationships of: $\Theta 1 = \theta 1 + \eta$, $\Theta 2 = \theta 2 + \eta$, and $\eta = \sigma + \phi$.

Figure 4:
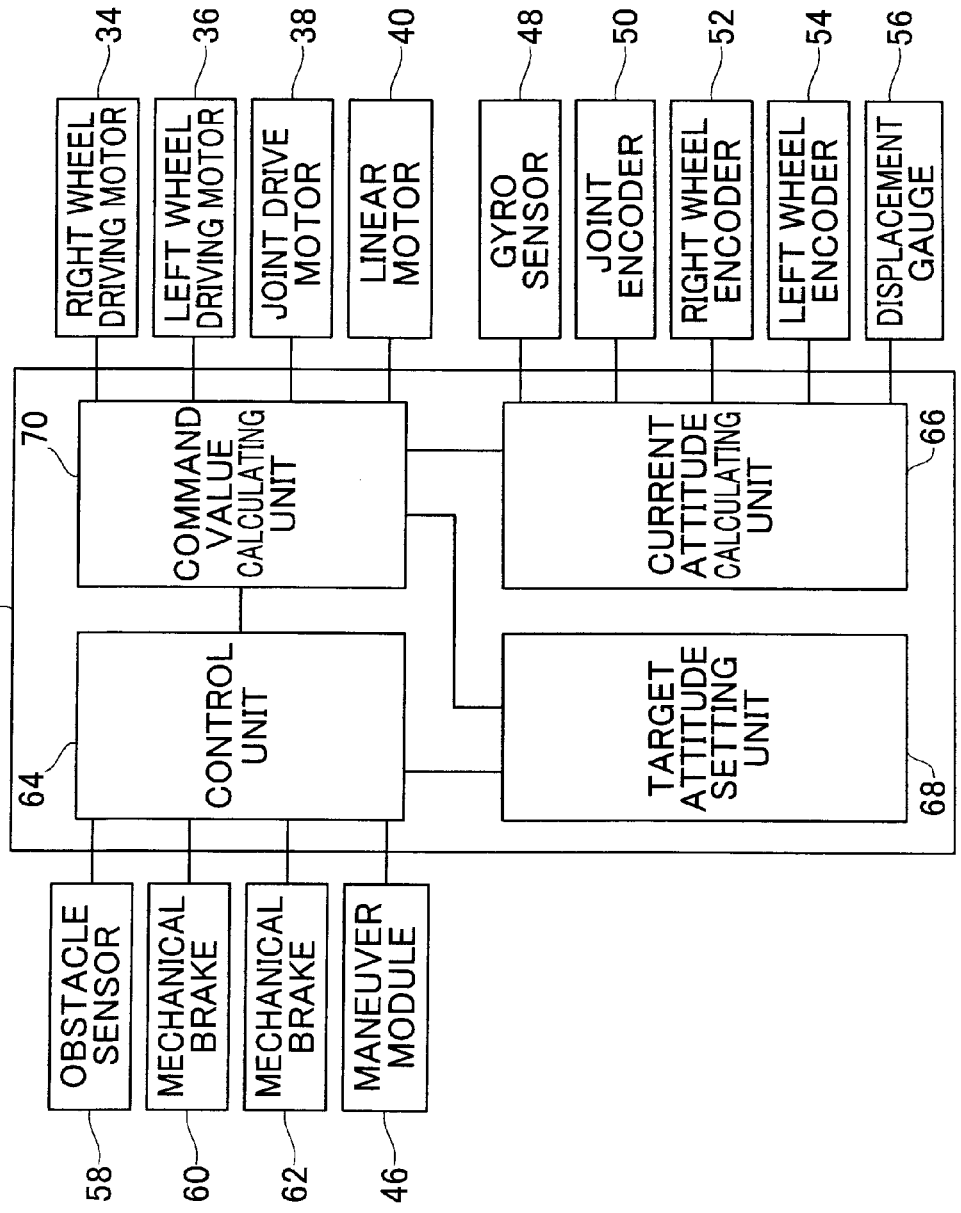
FIG. 4 is a block diagram of the configuration of a travel control module 44 and an attitude control module 45 of the first embodiment.

Next, description on the control system of the moving vehicle 10 will be given. FIG. 4 is a block diagram showing the configuration of a control system in the moving vehicle 10. The travel control module 44 and the attitude control module 45 are constituted by CPU, ROM, and RAM, or the like. Functionally, the travel control module 44 and the attitude control module 45 include a control unit 64, a current attitude calculating unit 66, a target attitude setting unit 68 and a command value calculating unit 70.

The control unit 64 controls the current attitude calculating unit 66, the target attitude setting unit 68 and the command value calculating unit 70 to carry out processing in accordance with inputs from the maneuver module 46 and the obstacle sensor 58.

The current attitude calculating unit 66 calculates current attitude values of the moving vehicle 10 based on inputs from the gyro sensor 48, joint encoder 50, right wheel encoder 52, left wheel encoder 54 and displacement gauge 56. The current attitude calculating unit 66 calculates, as the current attitudes of the moving vehicle 10, a relative displacement quantity $\delta^*$ and a relative displacement velocity $d\delta^*/dt$ of the vehicle body 12 with respect to the intervenient link 14, an inclinational angle $\sigma^*$ and an inclinational angular velocity $d\sigma^*/dt$ of the vehicle body 12, an inclinational angle $\eta^*$ and an inclinational angular velocity $d\eta^*/dt$ of the chassis 16, a rotational angle $\theta 1^*$ and a rotational angular velocity $d\theta 1^*/dt$ of the right driving wheel 18, and a rotational angle $\theta 2^*$, and a rotational angular velocity $d\theta 2^*/dt$ of the left driving wheel 20. Asterisk "*" is used for distinguishing between a current value and a target value. The values marked with the asterisk * represent current values.

The relative displacement quantity $\delta^*$ of the vehicle body 12 with respect to the intervenient link 14 is outputted from the displacement gauge 56. The relative displacement velocity $d\delta^*/dt$ of the vehicle body 12 with respect to the intervenient link 14 is calculated by differentiating the relative displacement quantity $\delta^*$ with respect to time.

The inclinational angular velocity $d\sigma^*/dt$ of the vehicle body 12 is outputted from the gyro sensor 48. The inclinational angle $\sigma^*$ of the vehicle body 12 is calculated by integrating the inclinational angular velocity $d\sigma^*/dt$ with respect to time.

The inclinational angle $\eta^*$ of the chassis 16 is calculated by an equation of $\eta^*=\sigma^*+\phi^*$ from the inclinational angle $\sigma^*$ of the vehicle body 12 and the relative rotational angle $\phi^*$ of the intervenient link 14 with respect to the chassis 16 which is outputted from the joint encoder 50. The inclinational angular velocity $d\eta^*/dt$ of the chassis 16 is calculated by differentiating the inclinational angle $\eta^*$ with respect to time.

The inclinational angle $\theta 1^*$ of the right driving wheel 18 is calculated from the inclinational angle $\eta^*$ of the chassis 16 and the relative rotational angle $\Theta 1^*$ of the right driving wheel 18 with respect to the chassis 16 which is outputted from the right wheel encoder 52. The inclinational angular velocity $d\theta 1^*/dt$ is calculated by differentiating the inclinational angle $\theta 1^*$ with respect to time.

The inclinational angle $\theta 2^*$ of the left driving wheel 20 is calculated from the inclinational angle $\eta^*$ of the chassis 16 and the relative rotational angle $\Theta 2^*$ of the left driving wheel 20 with respect to the chassis 16 which is inputted from the left wheel encoder 54. The inclinational angular velocity $d\theta 2^*/dt$ is calculated by differentiating the inclinational angle $\theta 2^*$ with respect to time.

The current attitude calculating unit 66 outputs the current attitude values of the moving vehicle 10 that are calculated in the above manner into the command value calculating unit 70.

The target attitude setting unit 68 sets target a time series pattern with respect to the rotational angle $\theta 1$ and rotational angular velocity $d\theta 1/dt$ of the right driving wheel 18, rotational angle $\theta 2$ and rotational angular velocity $d\theta 2/dt$ of the left driving wheel 20, inclinational angle $\eta$ and inclinational angular velocity $d\eta/dt$ of the chassis 16, inclinational angle $\sigma$ and inclinational angular velocity $d\sigma/dt$ of the vehicle body 12, and relative displacement quantity $\delta$ and relative displacement velocity $d\delta/dt$ of the vehicle body 12.

Target values for the rotational angle $\theta 1$ and rotational angular velocity $d\theta 1/dt$ of the right driving wheel 18 and rotational angle $\theta 2$ and rotational angular velocity $d\theta 2/dt$ of the left driving wheel 20 are respectively set based mainly on the state of operation of the maneuver module 46 and whether a detection signal from the obstacle sensor 58 is present or not.

The inclinational angle $\sigma$ and inclinational angular velocity $d\sigma/dt$ of the vehicle body 12 can be given in terms of desired pattern. In the moving vehicle 10 of this embodiment, the inclinational angle $\sigma$ and the inclinational angular velocity $d\sigma/dt$ are each set to zero. As a result, the vehicle body 12 is maintained substantially horizontal without tilting during travel. Note that setting the inclinational angle $\sigma$ and the inclinational angular velocity $d\sigma/dt$ to be zero does not mean that the intervenient link 14 does not swing with respect to the chassis 16. The intervenient link 14 is swung with respect to the chassis 16 so that it coincides with the inclinational angle $\eta$ of the chassis 16. The vehicle body 12 is thus regulated to be in equilibrium with its inclinational angle $\sigma$ adjusted to be zero.

The target attitude setting unit 68 sets, in accordance with the conditions met, a target time series pattern for one of the set of the relative displacement quantity $\delta$ and relative displacement velocity $d\delta/dt$ of the vehicle body 12 with respect to the intervenient link 14, or the set of the inclinational angle $\eta$ and inclinational angular velocity $d\eta/dt$ of the chassis 16.

In a case where the moving vehicle 10 commences a sudden braking operation while in motion, the target attitude setting unit 68 sets the target time series pattern for the relative displacement quantity $\delta$ and relative displacement velocity $d\delta/dt$ of the vehicle body 12 with respect to the intervenient link 14. At the time of starting the sudden braking operation, the vehicle body 12 is shifted backward with respect to the intervenient link 14, so as to bring the center of gravity of the moving vehicle 10 to shift backward. Balance is thus taken with inertia force that is generated by the sudden braking operation. The target attitude setting unit 68 sets the relative displacement quantity $\delta$ and the relative displacement velocity $d\delta/dt$ such that the vehicle body 12 shifts backward with respect to the intervenient link 14. A plurality of time series patterns of the relative displacement quantity $\delta$ and relative displacement velocity $d\delta/dt$ may be predeterminedly stored in the target attitude setting unit 68. Among the plurality of time series patterns, a time series pattern that increases the backward displacement quantity $\delta$ of the vehicle body 12 upon commencement of the sudden braking operation and decreases the displacement quantity $\delta$ in accordance with the decrease of the inertia force may be stored in the target attitude setting unit 68.

In a case where the rotational angular velocity of the right and left driving wheels 18, 20 decreases as a result of the sudden braking operation, the target attitude setting unit 68 sets target values for the inclinational angle $\eta$ and inclinational angular velocity $d\eta/dt$ of the chassis 16. As the rotational angular velocity of the right and left driving wheels 18, 20 decreases, the chassis 16 tends to rotate forward in the traveling direction around the rotational axis C1. The target attitude setting unit 68 sets target values for the inclinational angle $\eta$ and the inclinational angular velocity $d\eta/dt$ such that the inclinational angular velocity $d\eta/dt$ of the chassis 16 coincides with the rotational angular velocity $d\theta/dt$ of the right driving wheel 18 and the rotational angular velocity $d\theta 2/dt$ of the left driving wheel 20.

In a case where the target values for the relative displacement quantity $\delta$ and relative displacement velocity $d\delta/dt$ of the vehicle body 12 are inputted from the target attitude setting unit 68, the command value calculating unit 70 calculates the inclinational angle $\eta$ and inclinational angular velocity $d\eta/dt$ of the chassis 16 such that a stably balanced attitude under the inverted pendulum condition can be dynamically maintained.

In the case where the target values for the inclinational angle $\eta$ and inclinational angular velocity $d\eta/dt$ of the chassis 16 are inputted from the target attitude setting unit 68, the command value calculating unit 70 calculates the relative displacement quantity $\delta$ and relative displacement velocity $d\delta/dt$ of the vehicle body 12 such that the stable attitude can be maintained. In this case likewise, a time series pattern that increases the backward displacement quantity $\delta$ of the vehicle body 12 upon start of the sudden braking operation and decreases the displacement quantity $\delta$ in accordance with the decrease of the inertia force is calculated.

Based on the current attitude outputted from the current attitude calculating unit 66 and the target attitude outputted from the target attitude setting unit 68, the command value calculating unit 70 calculates command values to instruct to the right driving motor 34, left driving motor 36, joint drive motor 38 and linear motor 40. A kinematics model of the moving vehicle 10 is utilized in calculating the command values.

The command values to be commanded to respective motors calculated in the command value calculating unit 70 are inputted to the right wheel driving motor 34, left wheel driving motor 36, joint drive motor 38 and linear motor 40 respectively. The right and left wheel driving motors 34, 36, joint drive motor 38 and linear motor 40 are driven in accordance with the inputted command values. Driving operation of the motors causes the moving vehicle 10 to perform operation such as traveling, circling or stopping. Furthermore, the moving vehicle 10 performs with the driven force of the motors a relative position adjustment of the vehicle body 12 to the chassis 16.

The attitude of the moving vehicle 10 is controlled such that it can travel, circle and stop while maintaining a balanced state. While the moving vehicle 10 is ceased or moving at a constant speed, its attitude is controlled so that the center of gravity lies at a nearly vertical position above the rotational axis C1. Meanwhile, the values of $\eta$, $\sigma$ and $\delta$ are maintained at values close to zero.

Figure 5:
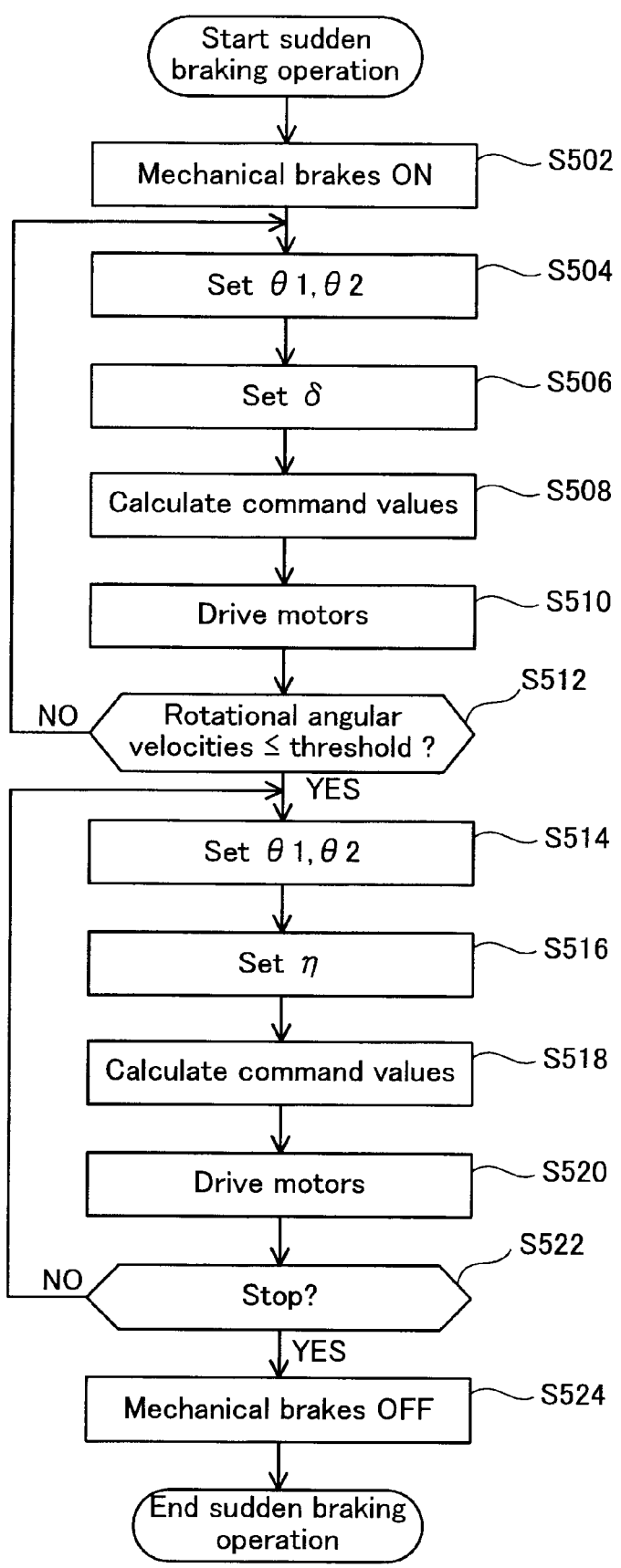
FIG. 5 is a flow chart of processes of a sudden braking operation of the moving vehicle 10 of the first embodiment.

A description on the processes carried out in applying sudden braking during motion will hereinafter be given with reference to the flow chart of FIG. 5. The moving vehicle 10 commence the sudden braking operation as below when an obstacle is detected ahead by the obstacle sensor 58.

In step S502, the mechanical brakes 60 and 62 are actuated. As a result of actuation of the mechanical brakes 60 and 62, a torque that restrains the rotation of the wheels is exerted between the right driving wheel 18 and the chassis 16 and also between the left driving wheel 20 and the chassis 16.

In step S504, target values for the rotational angle $\theta 0$, $\theta 2$ and the rotational angular velocity $d\theta 1/dt$, $d\theta 2/dt$ of the right and left driving wheel 18, 20 are respectively set.

In step S506, target values for the relative displacement quantity $\delta$ and relative displacement velocity $d\delta/dt$ of the vehicle body 12 with respect to the intervenient link 14 are set. The relative displacement quantity $\delta$ and relative displacement velocity $d\delta/dt$ are set so as to shift the vehicle body 12 backward with respect to the intervenient link 14. The setting of the relative displacement quantity $\delta$ and relative displacement velocity $d\delta/dt$ may be performed by reading certain time series pattern that is predeterminedly stored.

In step S508, command values for the motors are calculated in accordance with the aforeset target values.

In step S510, the motors are driven in accordance with the calculated command values. Under the effect of the driving force, the vehicle body 12 shifts backward with respect to the intervenient link 14 and the inclinational angle $\eta$ is adjusted so as to maintain balance under the inverted pendulum condition of the moving vehicle 10. Coincidentally, the backward inclinational angle $\eta$ necessary for keeping the evenness with inertia force can be kept small, because the vehicle body 12 is shifted backward with respect to the intervenient link 14 and thereby the center of gravity is also shifted backward. The backward inclinational angle of the vehicle body 12 during sudden braking is kept small, in comparison to the case where the vehicle body 12 is not shifted backward.

In step S512, it is determined whether the relative rotational angular velocities $d\Theta 1/dt$ and $d\Theta 2/dt$ of the right and left driving wheels 18, 20 with respect to the chassis 16 have decreased to equal or be less than a predetermined threshold value. If both $d\Theta 1/dt$ and $d\Theta 2/dt$ are less than or equal to the threshold value (YES in step S512), it is determined that the rotation of the right and left driving wheels 18, 20 have sufficiently been decreased to an allowable extent, and the process proceeds to step S514. On the other hand, if at least one of $d\Theta 1/dt$ and $d\Theta 2/dt$ exceeds the threshold value (NO in step S512), it is determined that the rotation of the right and left driving wheels 18, 20 have not been decreased enough yet and the process returns to step S504 which is followed by the processes in series to step S510.

In step S514, target values for the rotational angles $\theta 1$, $\theta 2$ and rotational angular velocities $d\theta 1/dt$, $d\theta 2/dt$ of the right and left driving wheels 18, 20 are set.

In step S516, an inclinational angular velocity $d\eta/dt$ is set such that the inclinational angular velocity $d\eta/dt$ of the chassis 16 matches the rotational angular velocities $d\theta 1/dt$ and $d\theta 2/dt$ of the right and left driving wheels 18, 20.

In step S518, command values for the respective motors are calculated based on the set target values.

In step S520, the motors are driven in accordance with the calculated command values. The chassis 16, which has been tilted backward, thereby rotates synchronously with the right and left driving wheels 18, 20 and is lifted vertically upward. During the lifting time, the relative displacement quantity $\delta$ is adjusted so as to maintain balance in the state of the inverted pendulum of the moving vehicle 10.

In step S522, it is determined whether or not the inclinational angle $\eta$ of the chassis 16 has become zero. If the inclinational angle $\eta$ has become zero (YES in step S522), this indicated that the center of gravity of the moving vehicle 10 has been shifted vertically upward above the rotational axis C1 and the moving vehicle 10 is in a standstill state. Therefore, the process proceeds to step S524. On the other hand, if the inclinational angle $\eta$ is not zero (NO in step S522), this indicates that the center of gravity of the moving vehicle 10 still lies tilted behind the rotational axis C1 and the moving vehicle 10 is not in the standstill state. Therefore, the process returns to step S514, which is followed by the processes in series to step S520.

In step S524, the mechanical brakes 60 and 62 are released. This is followed by shifting of state to a standstill state on the spot to maintain the balanced inverted pendulum attitude. The sudden braking operation is thus terminated.

Figure 6A:
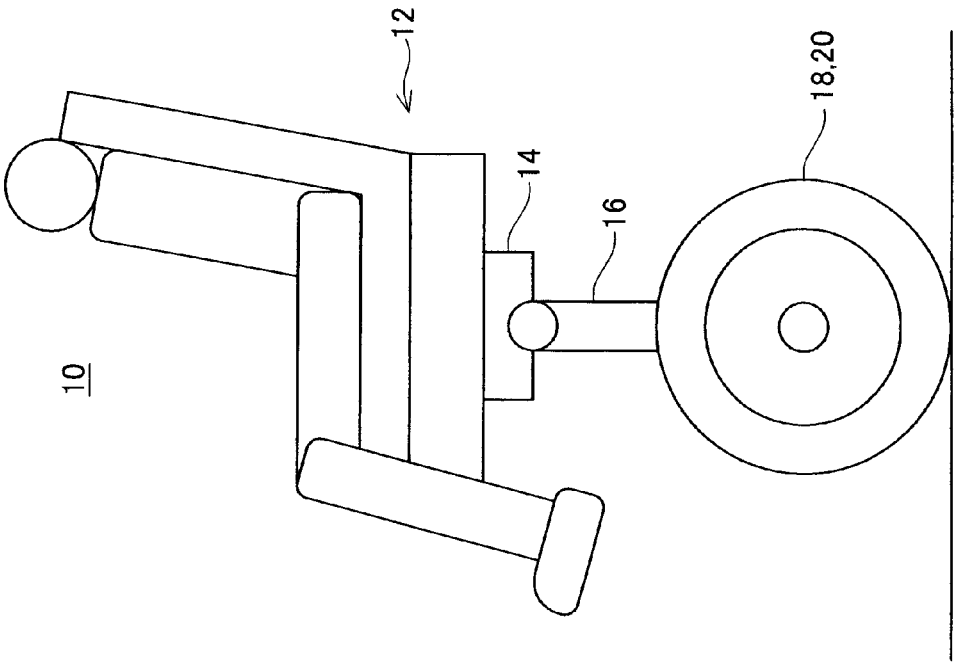
FIGS. 6A and 6B each illustrate a state of the sudden braking operation of the moving vehicle 10 of the first embodiment.
Figure 6B:
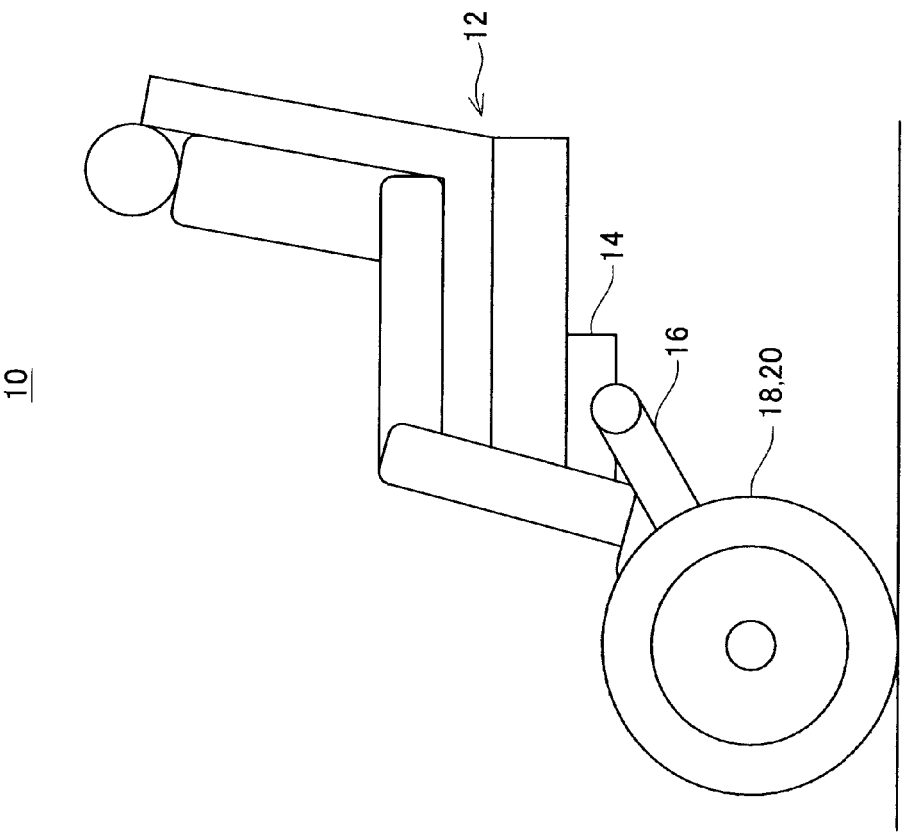

FIGS. 6A and 6B each shows a state of a sudden braking operation of the moving vehicle 10. The moving vehicle 10 in traveling motion as shown in FIG. 6A, when an obstacle is detected in front, shifts the vehicle body 12 backward with respect to the intervenient link 14 as shown in FIG. 6B. Further, the chassis 16 is tilted backward in order to balance the moment acting on the chassis 16 from the right and left driving wheels 18, 20 due to the braking motion, the gravitational moment acting on the moving vehicle 10 and the moment induced by inertia force acting on the moving vehicle 10. Since the vehicle body 12 is shifted backward with respect to the intervenient link 14, the gravitational moment contributing to braking increases, and thereby a significant braking force can be induced by the mechanical brakes 60 and 62. Consequently, the traveling body can stop within a short braking distance while maintaining its state of inverted pendulum in a stable manner.

As for the moving vehicle 10 of this embodiment, the vehicle body 12 is shifted backward at the time of starting the sudden braking operation. Therefore, even in an event of collision of the moving vehicle 10 with the obstacle during the braking operation, the onboard seat 22 being retracted backward can keep the rider away from the hazard.

As for the moving vehicle 10 of this embodiment, when the rotation of the right and left driving wheels 18, 20 are weakened by the sudden braking, the chassis 16 is rotated along with the right and left driving wheels 18, 20. The center of gravity of the moving vehicle 10, which had been shifted backward at the time of sudden braking, can thereby rise upward by means of inertia. Energy required for shifting to a stationarily balanced attitude in the inverted pendulum manner can thus be saved.

Although in this embodiment a case in which a sudden braking operation is performed in accordance with a detection signal from the obstacle sensor 58 has been explained, a sudden braking operation may be performed in accordance with a braking instruction provided by the rider with the maneuver module 46.

Furthermore, although in this embodiment a case in which the linear motor 40 is used as the device for operating the intervenient link 14 with respect to the vehicle body 12 has been explained, the device that operates the intervenient link 14 with respect to the vehicle body 12 is not limited to the linear motor. A ball screw and an ordinary type of a motor in combination, or a linear slide type motor mechanism, for example, may be used as the device for operating the intervenient link 14 with respect to the vehicle body 12.

Although in this embodiment a case in which the mechanical brakes 60 and 62 are used as brakes against the right and left driving wheels 18, 20, electrical brakes may be used instead of the mechanical brakes, or both mechanical brakes 60, 62 and electrical brakes may be used in combination.

Moreover, although in this embodiment a case has been explained in which the relative displacement quantity δ and relative displacement velocity dδ/dt of the vehicle body 12 with respect to the intervenient link 14 are set in accordance with certain time series patterns stored in advance, the method for setting the relative displacement quantity δ and relative displacement velocity dδ/dt is not limited to the said method. For example, the vehicle body 12 may be shifted backward by a feed forward control.

Although in this embodiment a case in which the relative displacement quantity δ of the vehicle body 12 with respect to the intervenient link 14 is measured using the displacement gauge 56 has been explained, the relative displacement quantity δ may be estimated using, for example, a state observer.

Second Embodiment

Figure 7:
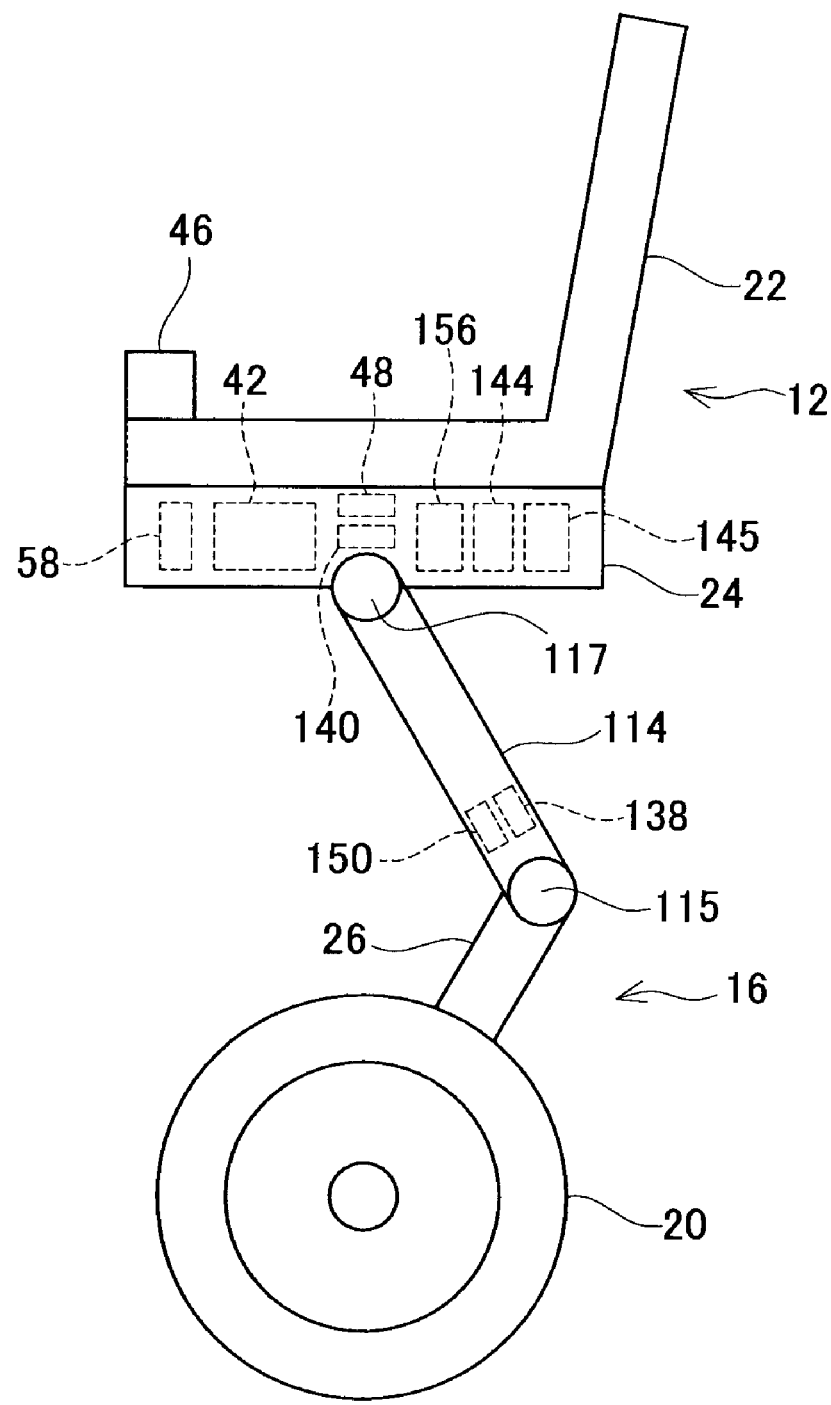
FIG. 7 is a side view of a moving vehicle 110 according to a second embodiment.

A moving vehicle 110 according to a second embodiment of the present invention will be described with reference to FIG. 7. As to the same constructional portions as in the moving vehicle 10 of the first embodiment, they are identified by the same reference numerals as in the first embodiment and explanations thereof may hereinafter be omitted.

The moving vehicle 110 of this second embodiment includes a vehicle body 12, an intervenient link 114, a chassis 16, a right driving wheel 18 and a left driving wheel 20. The intervenient link 114 is connected to a lower portion of a housing 24 of the vehicle body 12 with respect to the vehicle body 12 within a vertical plane including a traveling direction of the moving vehicle 110 (which corresponds to a plane parallel to the paper surface of FIG. 7) in a swingable manner. An upper portion of a rod 26 of the chassis 16 is swingably connected to a lower portion of the intervenient member 114 with respect to the intervenient member 114 within the vertical plane including the traveling direction of the moving vehicle 110 (which corresponds to the plane parallel to the paper surface of FIG. 7). The intervenient link 14 corresponds to the intervenient member.

The moving vehicle 110 includes a right wheel driving motor 34, a left wheel driving motor 36, a first joint drive motor 138 for swinging the intervenient link 114 around a rotary shaft 115 with respect to the chassis 16, and a second joint drive motor 140 for swinging the vehicle body 12 around a rotary shaft 117 with respect to the intervenient link 114. The first joint drive motor 138 is installed in the intervenient link 114. The second joint drive motor 140 is installed in the housing 24. The first joint drive motor 138 corresponds to the first actuator and the second joint drive motor 140 corresponds to the second actuator.

The moving vehicle 110 includes a battery module 42 for the supplying electric power to the right wheel driving motor 34, left wheel driving motor 36, first joint drive motor 138 and second joint drive motor 140; a travel control module 144 for controlling both right and left wheel driving motors 34, 36; an attitude control module 145 for controlling both first and second joint drive motors 138, 140; and an maneuver module 46 to be operated by a rider on the moving vehicle 110. The travel control module 144 controls the right and left wheel driving motors 34, 36 to control the travel of the moving vehicle 110, in accordance with the control performed on the maneuver module 46 by the rider. The attitude control module 145 controls the first and second joint drive motors 138, 140 to control the relative positional relationship of the vehicle body 12 with respect to the chassis 16. The travel control module 144 corresponds to the inverted pendulum control unit. The attitude control module 145 corresponds to the braking attitude control unit.

The moving vehicle 110 includes a first joint encoder 150 for detecting the swing angle of the intervenient link 114 with respect to the chassis 16, a second joint encoder 156 for detecting the swing angle of the vehicle body 12 with respect to the intervenient link 114, and a gyro sensor 48 for detecting the inclinational angular velocity of the vehicle body 12. Further, the moving vehicle 110 includes a right wheel encoder 52 for detecting the relative rotational angle of the right driving wheel 18 with respect to the chassis 16, a left wheel encoder 54 for detecting the relative rotational angle of the left driving wheel 20 with respect to the chassis 16, an obstacle sensor 58 and mechanical brakes 60, 62.

The travel control module 144 and the attitude control module 145 have substantially the same configurations as those of the travel control module 44 and the attitude control module 45 of the moving vehicle 10 of the first embodiment.

As for the moving vehicle 110 of this second embodiment, unlike the moving vehicle 10 of the first embodiment, the inclinational angle of the vehicle body 12 and the inclinational angle of the intervenient link 114 are each regulated independently. As for the moving vehicle 110 of this second embodiment, the inclinational angle and inclinational angular velocity of the vehicle body 12 are adjusted so as to become zero. The vehicle body 12 is thereby maintained nearly horizontal even during travel.

In the moving vehicle 110 of this second embodiment, in accordance with the situation demands, one of the sets of the inclinational angle and inclinational angular velocity of the intervenient link 114 and the set of the inclinational angle and inclinational angular velocity of the chassis 16 is adjusted in accordance with the corresponding target time series pattern.

In a case where the moving vehicle 110 commences a sudden braking operation while in motion, the inclinational angle and inclinational angular velocity of the intervenient link 114 are adjusted to one of the predetermined time series patterns such that the intervenient link 114 tilts backward. The vehicle body 12 thereby shifts backward, and the center of gravity of the moving vehicle shifts backward. In this case, the inclinational angle and inclinational angular velocity of the chassis 16 are adjusted so that a stable state of inverted pendulum can be maintained.

Figure 8A:
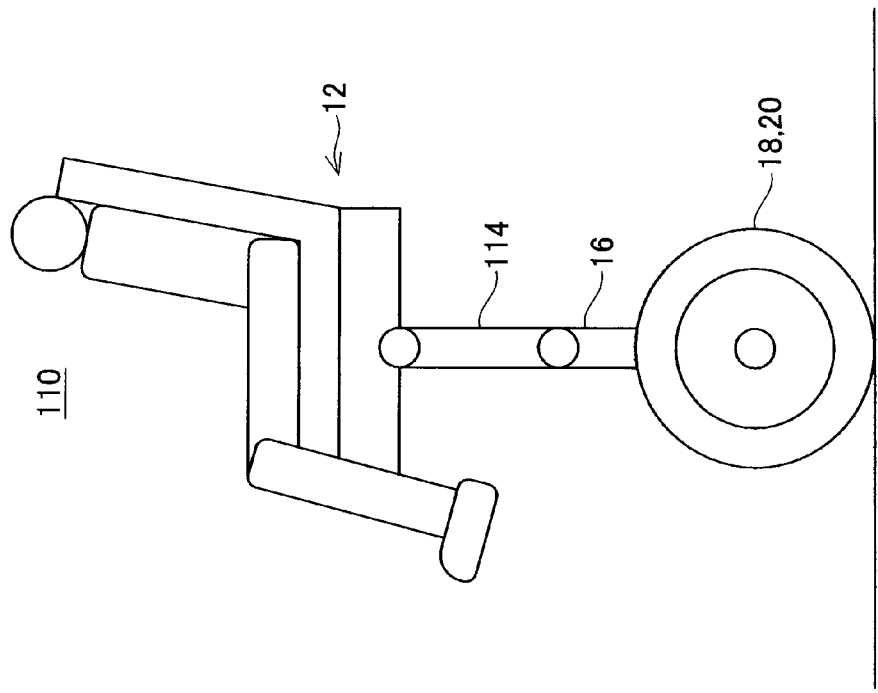
FIGS. 8A and 8B each illustrate a state of a sudden braking operation of the moving vehicle 110 of the second embodiment.
Figure 8B:
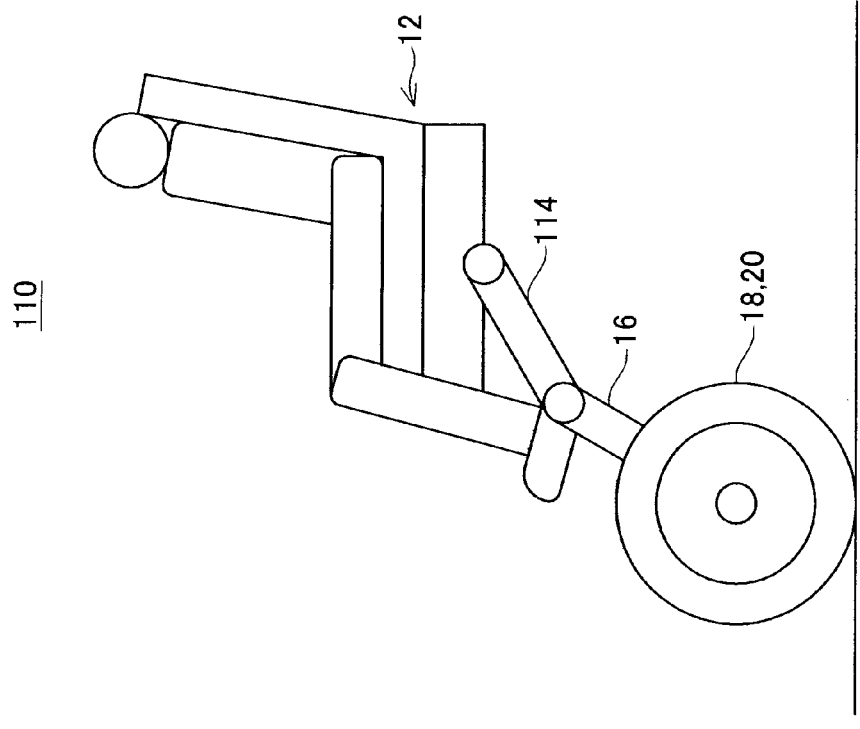

FIG. 8A shows a traveling state of the moving vehicle 110 and FIG. 8B shows a braking state from the traveling state of the moving vehicle 110. As braking starts, the moving vehicle 110 tilts the intervenient link 114 backward, shifts the vehicle body 12 backward and thus shifts the center of gravity of the moving vehicle 110 backward. A significant gravitational moment is thereby induced and a balanced attitude can be maintained even when strong braking is performed.

When the rotation of the right and left driving wheels 18, 20 are weakened by the sudden braking operation, the inclinational angle and inclinational angular velocity of the chassis 16 are adjusted such that the chassis 16 rotates synchronously with the rotation of the right and left driving wheels 18, 20. The center of gravity, which had been shifted backward by the sudden braking operation, is thereby raised vertically upwards by means of inertia to vertically above the rotational axis C1.

Figure 9:
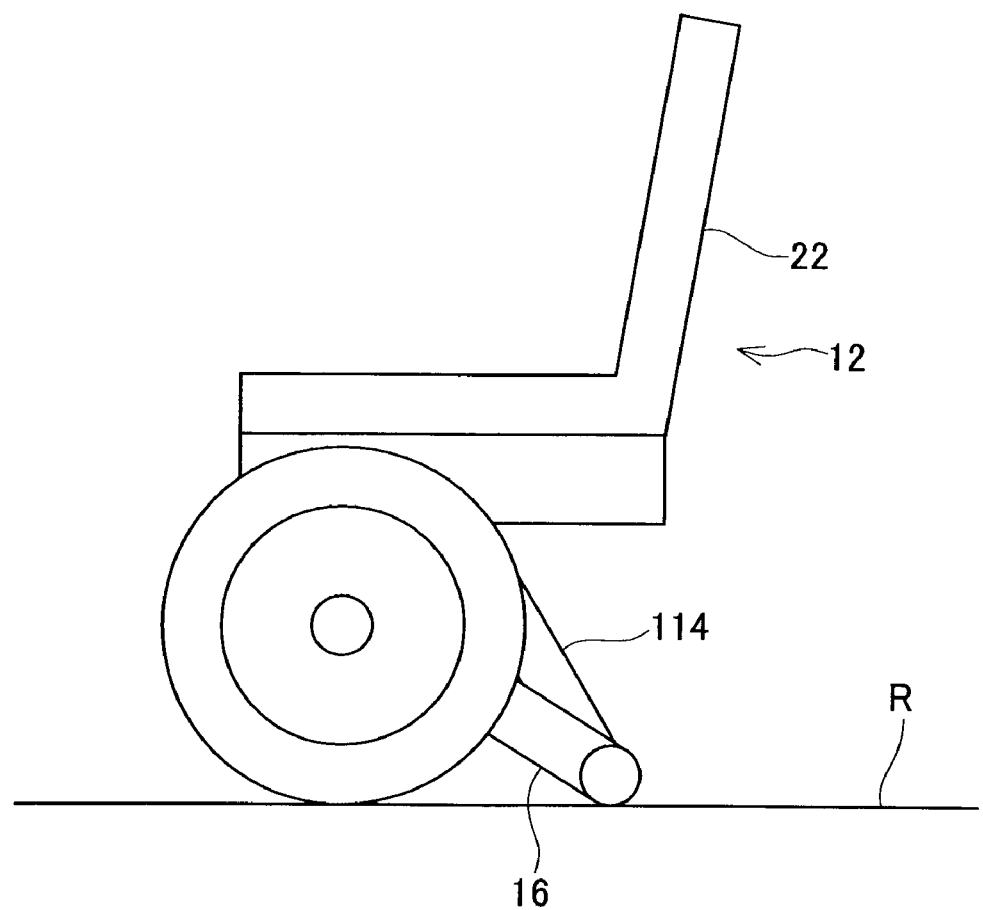
FIG. 9 illustrates a cease state of the moving vehicle 110 of the second embodiment.

As for the moving vehicle 110 of this second embodiment, as shown in FIG. 9, the intervenient link 114 and the chassis 16 may be bent and the connecting portion between the intervenient link 114 and the chassis 16 may be brought into contact with the road surface R, to utilize it as an auxiliary member during stopping motion of the moving vehicle 110. This allows the on-board seat 22 to be in a descended state, and therefore makes the rider's getting on and off easier as well as the loading and unloading of goods easier.

The specific embodiment of the present invention is described above, but these merely illustrate some embodiments of the invention and do not restrict the claims thereof. The art set forth in the claims includes various transformations and modifications to the specific embodiments as set forth above.

Furthermore, the technical elements disclosed in the present specification or figures may be utilized separately or in all types of conjunctions and are not limited to the conjunctions set forth in the claims at the time of filing of the application. Furthermore, the art disclosed in the present specification or figures may be utilized to simultaneously realize a plurality of aims or to realize one of these aims.

The invention claimed is:

1. A coaxial two-wheeled inverted pendulum type moving vehicle comprising:
   a pair of wheels;
   a chassis that supports the pair of wheels coaxially and rotatably;
   wheel actuators configured to rotate the pair of wheels with respect to the chassis;
   a vehicle body supported by the chassis, wherein the vehicle body is configured to shift with respect to the chassis in a direction parallel to a moving direction of the moving vehicle;
   an inverted pendulum control unit that controls the wheel actuators to maintain balance in an inverted pendulum attitude of the chassis;
   an attitude actuator that is configured to shift the vehicle body with respect to the chassis in the direction parallel to the moving direction of the moving vehicle; and
   a braking attitude control unit that controls the attitude actuator to maintain the vehicle body substantially horizontal, wherein:
      the vehicle body is supported by the chassis with an intervenient member arranged in between the vehicle body and the chassis,
      the intervenient member is connected to the chassis such that the intervenient member is configured to swing within a vertical plane including the moving direction, and the intervenient member supports the vehicle body such that the vehicle body is configured to slide parallel to the moving direction, and
      the attitude actuator comprises a first actuator that swings the intervenient member with respect to the chassis in an opposite direction of the moving direction and a second actuator that slides the vehicle body with respect to the intervenient member in the opposite direction of the moving direction.

2. A coaxial two-wheeled inverted pendulum type moving vehicle according to claim 1, further comprising mechanical brakes for braking the pair of wheels with respect to the chassis.

3. A coaxial two-wheeled inverted pendulum type moving vehicle according to claim 1, further including an obstacle sensor configured to detect obstacles in a path of the coaxial two-wheeled inverted pendulum type moving vehicle and to generate a corresponding obstacle signal transmitted to the inverted pendulum control unit, wherein shifting of the vehicle body and braking of the coaxial two-wheeled inverted pendulum type moving vehicle commence upon receipt of the obstacle signal at the inverted pendulum control unit.

4. A coaxial two-wheeled inverted pendulum type moving vehicle according to claim 1, further including a rod disposed between the chassis and the intervenient member wherein:
   the first actuator is a joint drive motor configured to rotationally connect the intervenient member to an end of the rod; and
   the second actuator is a linear motor configured to rotationally fix a second end of the intervenient member to the vehicle body and to linearly translate the vehicle body relative to the intervenient member.

5. A coaxial two-wheeled inverted pendulum type moving vehicle according to claim 1, wherein the braking attitude control unit controls the attitude actuator, in order to maintain the vehicle body substantially horizontal, to shift the vehicle body with respect to the chassis in the opposite direction of the moving direction of the moving vehicle when a braking is commenced while the moving vehicle is in motion.

6. A moving vehicle, comprising:
   a pair of wheels;
   a chassis that supports the pair of wheels coaxially and rotatably;
   wheel actuators configured to rotate the pair of wheels with respect to the chassis;
   an intervenient member supported by the chassis such that the intervenient member is configured to swing within a vertical plane including a moving direction;
   a first attitude actuator configured to swing the intervenient member with respect to the chassis in an opposite direction of the moving direction;
   a vehicle body supported by the intervenient member such that the vehicle body is configured to slide in the moving direction with respect to the intervenient member;
   a second attitude actuator configured to slide the vehicle body with respect to the intervenient member in the opposite direction of the moving direction;
   an inverted pendulum control unit that controls the wheel actuators to maintain balance in an inverted pendulum attitude of the chassis while the moving vehicle is in motion; and
   an attitude control unit that controls the first and the second attitude actuators to maintain the vehicle body substantially horizontal while the moving vehicle is in motion.

7. A moving vehicle according to claim 6, further comprising mechanical brakes for braking the pair of wheels with respect to the chassis.

8. A moving vehicle, comprising:
- a pair of wheels;
- a chassis that supports the pair of wheels coaxially and rotatably;
- wheel actuators configured to rotate the pair of wheels with respect to the chassis;
- an intervenient member supported by the chassis such that the intervenient member is configured to swing with respect to the chassis within a vertical plane including a moving direction of the moving vehicle;
- a vehicle body supported by the intervenient member such that the vehicle body is configured to slide with respect to the intervenient member in a direction parallel to the moving direction;
- an inverted pendulum control unit that controls the wheel actuators to maintain balance in an inverted pendulum attitude of the chassis;
- an obstacle sensor configured to detect obstacles in a path of the moving vehicle and to generate a corresponding obstacle signal; and
- an attitude control unit configured to, in response to the obstacle signal, swing the intervenient member with respect to the chassis in an opposite direction of the moving direction and slide the vehicle body with respect to the intervenient member in the opposite direction of the moving direction to maintain the vehicle body substantially horizontal.

9. A coaxial two-wheeled inverted pendulum type moving vehicle comprising:
- a pair of wheels;
- a chassis that supports the pair of wheels coaxially and rotatably;
- wheel actuators configured to rotate the pair of wheels with respect to the chassis;
- a vehicle body supported by the chassis, wherein the vehicle body is configured to shift with respect to the chassis in a direction parallel to a moving direction of the moving vehicle;
- an inverted pendulum control unit that controls the wheel actuators to maintain balance in an inverted pendulum attitude of the chassis;
- an attitude actuator that is configured to shift the vehicle body with respect to the chassis in the direction parallel to the moving direction of the moving vehicle; and
- a braking attitude control unit that controls the attitude actuator to shift the vehicle body with respect to the chassis to an opposite direction of the moving direction of the moving vehicle when a braking is commenced while the moving vehicle is in motion, wherein:
  - the vehicle body is supported by the chassis with an intervenient member arranged in between the vehicle body and the chassis;
  - the intervenient member is connected to the chassis such that the intervenient member is configured to swing within a vertical plane including the moving direction, and the intervenient member supports the vehicle body such that the vehicle body is configured to slide parallel to the moving direction;
  - the attitude actuator comprises a first actuator that swings the intervenient member with respect to the chassis in an opposite direction of the moving direction and a second actuator that slides the vehicle body with respect to the intervenient member in the opposite direction of the moving direction;
  - the moving vehicle further includes a rod disposed between the chassis and the intervenient member;
  - the first actuator is a joint drive motor configured to rotationally connect the intervenient member to an end of the rod; and
  - the second actuator is a linear motor configured to rotationally fix a second end of the intervenient member to the vehicle body and to linearly translate the vehicle body relative to the intervenient member.

10. A coaxial two-wheeled inverted pendulum type moving vehicle according to claim 9, further comprising mechanical brakes for braking the pair of wheels with respect to the chassis.

* * * * *